J. R. Wharry.
Window-Netting.
N° 75612      Patented Mar. 17, 1868.
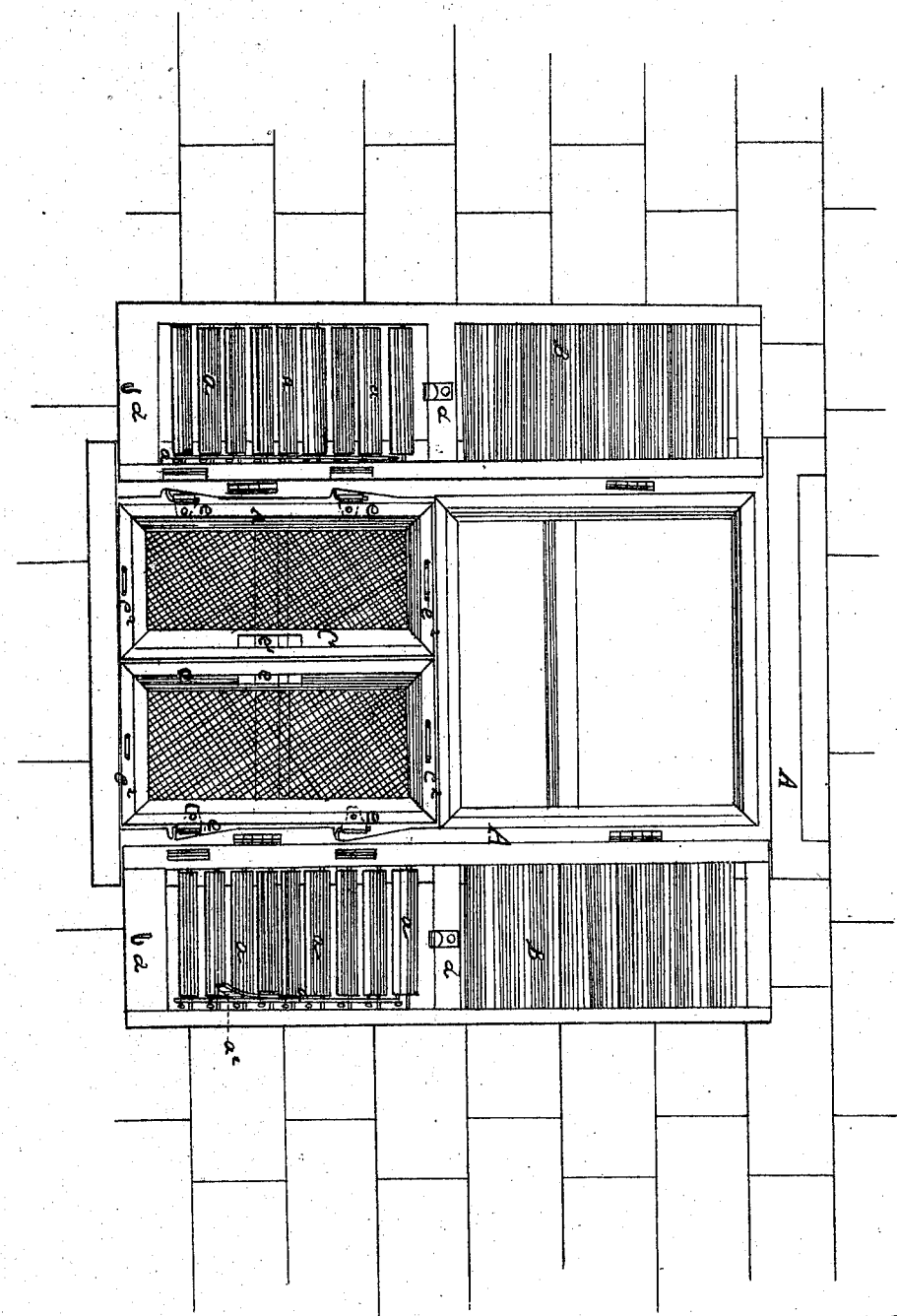
WITNESSES.
W. C. Ashketter
Theo Tasche
INVENTOR.
John R. Wharry
per Munn &co
attorneys

United States Patent Office.

JOHN R. WHARRY, OF MOUNDSVILLE, WEST VIRGINIA.

Letters Patent No. 75,612, dated March 17, 1868.

IMPROVED WINDOW-NETTING.

*The Schedule referred to in these Letters Patent and making part of the same.*

TO ALL WHOM IT MAY CONCERN:

Be it known that I, JOHN R. WHARRY, of Moundsville, in the county of Marshall, and State of West Virginia, have invented a new and useful Improvement in Window-Blinds and Netting; and I do hereby declare that the following is a full, clear, and exact description thereof, which will enable others skilled in the art to make and use the same, reference being had to the accompanying drawings, forming part of this specification.

This invention relates to a new and useful improvement in the construction, attachment, and arrangement of netting-frames to a window-casing, whereby the netting-frames are more convenient, and more effectually prevent the intrusion of insects.

It consists in the netting being secured upon frames, which frames are hinged to the window-casing by slip-hinges, whereby the same are, at any time, easily removed.

It consists also in hooks, fastened upon the inside of the blinds, and of suitable staples upon the netting-frames, whereby the said netting-frames may, when removed from the window-casing, be hung, for convenience, upon the inside of said blinds.

The drawing is a front view of a window-casing, window, and blinds, with my invention in position thereon.

A is the window-casing, and B are the blinds; C are the netting-frames and netting; $e$ are slip-hinges on the same; $e^1$ are the slots in the same to receive bent levers $a^2$ upon the blinds; $e^2$ are staples on the same, by means of which said netting-frames are hung upon the blinds B; $d$ are hooks on the blinds B, to receive the staples $e^2$.

The window-blinds B are made of the same material, in the same general form, and hinged to the window-casing in like manner as the window-blinds in common use.

The netting-frames C are made and covered with netting in the ordinary way, and are made in pairs, as shown in the drawing, and are hinged to any convenient portion of the casing by the slip-hinges $e$, as shown, so that said frames C may, at any time, easily be removed. The frames C are provided, at the top and bottom of the same, with suitable metallic staples, $e^2$, by means of which said frames C are conveniently hung upon the blinds B.

Upon the inside of the blinds B, and so as to receive the staples $e^2$, are secured the metallic hooks $d$, as shown in the drawing.

The operation is easily seen from the drawing and the foregoing description.

Constructed as above, it constitutes also a more convenient manner of constructing and arranging the netting-frame and netting to prevent the intrusion of insects, whereby the same are more easily removed, at pleasure, and hung up, without occupying valuable room in the house.

I claim as new, and desire to secure by Letters Patent—

1. The slotted netting-frames C and slip-hinges $e$, in combination with any window-casing, A, substantially as shown and described, and for the purposes set forth.

2. The hooks $d$ and blinds B, in combination with the netting-frames C and staples $e^2$, substantially as shown and described, and for the purposes set forth.

JOHN R. WHARRY.

Witnesses:
 DAVID N. STALEY,
 W. W. SMITH.